United States Patent [19]
Wood et al.

[11] Patent Number: 5,279,708
[45] Date of Patent: Jan. 18, 1994

[54] SPRAY DRYING PROCESS WITH SPINNING ATOMIZER

[75] Inventors: William M. L. Wood, Huddersfield; Margaret Steel, Runcorn, both of England; Philip Norton-Berry, Clwyd, Wales

[73] Assignee: Imperial Chemical Industries PLC, London, England

[21] Appl. No.: 731,049

[22] Filed: Jul. 16, 1991

[30] Foreign Application Priority Data

Aug. 3, 1990 [GB] United Kingdom ............... 9017155

[51] Int. Cl.[5] ............................................. B01D 1/18
[52] U.S. Cl. ................................. 159/48.1; 159/4.2; 34/10
[58] Field of Search ............... 159/48.1, 4.2; 34/10, 34/57

[56] References Cited

U.S. PATENT DOCUMENTS

| 3,661,514 | 5/1972 | Herink | 159/48.1 |
| 4,369,091 | 1/1983 | Solver | 159/48.1 |
| 4,376,010 | 3/1983 | Gauvin | 159/48.1 |
| 4,490,403 | 12/1984 | Pisecky et al. | 159/4.04 |
| 4,708,967 | 11/1987 | Ferentchak et al. | 159/48.1 |

FOREIGN PATENT DOCUMENTS

0378498 7/1990 European Pat. Off.

*Primary Examiner*—Wilbur Bascomb, Jr.
*Attorney, Agent, or Firm*—Cushman, Darby & Cushman

[57] ABSTRACT

A process for obtaining a substantially dry particulate solid in the form of particles with a narrow particle size distribution which comprises atomising a feedstock comprising a solution or dispersion of the solid in a liquid medium into droplets with a narrow size distribution and a volume median diameter from 100 to 250 micrometers in a spray dryer whereby the droplets are converted into the dry particulate solid within the spray dryer.

15 Claims, 3 Drawing Sheets

SPRAY DRYING PROCESS WITH SPINNING ATOMIZER

This invention relates to a process for spray drying which provides a product with a narrow particle size distribution and low dust levels.

Spray drying is a commonly used method for producing dry product from liquid feedstock where a liquid feedstock is atomised into droplets. The droplets are contacted by a flow of hot air which evaporates the liquid to leave a dry product. The dry product usually has good flow properties and usually disperses or dissolves quickly in subsequent use because the individual product particles are small. However spray dried products are invariably dusty immediately after drying. Dust may be defined as small particles which can be easily entrained even in slight airflows, these particles can remain airborne for a significant time. Whether a particle will behave as dust depends on its particle size, shape and on its density typically for spray dried products dust has a particle size of about 30 micrometers or less. Dust can be a nuisance for example if derived from dyestuffs the dust may cause coloration in undesirable areas.

Dust in spray dried products arises from atomisers (such as rotary, pressure swirl nozzle and twin fluid nozzle atomisers) which produce a wide droplet size distribution of the liquid feedstock. Dust also arises from fracture or attrition of larger dried particles.

Additional problems also occur when drying droplets with a wide size distribution. For example the smaller droplets tend to dry more quickly and give an overdried solid which is often difficult to re-dissolve or re-disperse. Larger droplets tend to dry more slowly and can pass through the dryer unit without being thoroughly dried.

Atomisation techniques exist using electrostatics or ultrasonics, and these give a narrower drop size distribution than the conventional atomisers referred to above. Conventional rotary atomisers when operated at speeds greater than 10,000 rpm are also known to give narrow particle size distribution. However these techniques and procedures produce a droplet of a median size which is too small or they are unable to meet the high throughput demands of a commercial spray dryer. Furthermore, to operate at such high speeds, rotary atomisers need to be engineered very precisely and are therefore expensive to fabricate.

Spray dried products may be treated with dedusting agents such as mineral oils but additives of this type may not be tolerated in downstream processes or the dried product becomes sticky and its flow properties deteriorate.

Other techniques exist which reduce the dustiness of spray dried products for example fine dust particles can be attached to larger particles in a fluid bed agglomerator. However these post drying treatments are costly and require additional plant.

It is an object of the present invention to provide a process for spray drying in which dry products with a narrow particle size distribution and low dust content are obtained and additional processing or treatment to minimise dust can be avoided.

According to the present invention there is provided a process for obtaining a dry particulate solid with a narrow particle size distribution which comprises feeding a solution or dispersion of the solid in a liquid hereinafter referred to as the feedstock through an atomiser, located within a spray dryer, which atomises the liquid into droplets with a narrow size distribution and a volume median diameter from 100 to 250 micrometers, whereby the droplets may be converted into dry particles within the spray dryer.

To produce a spray dried product containing little dust directly from a spray dryer, without the need for subsequent treatment to reduce dust levels, it is desirable to use an atomiser and atomisation conditions which give a volume median diameter of droplets from 100 to 250 micrometers. With smaller volume median diameters the product contains large number of particles of less than 30–40 micrometers which can easily become airborne. With volume median diameters greater than 250 micrometers a significant number of droplets in excess of 400 micrometers are formed which take longer to dry and may collide with the walls of the dryer and stick to them or which may pass through the dryer without drying thoroughly.

A suitable spray drier for operating the present process preferably incorporates a specific design of atomiser which produces droplets with a desirable volume median diameter from 100 to 250 micrometers more readily than conventional atomisers. It is possible to produce dry products with narrow particle size distributions and low dust with a spray dryer having a smaller drying chamber than normal because the present atomiser produces a narrower range of droplet sizes with a lower proportion of oversize droplets. This narrower range of droplet size has a lower than normal tangential velocity reducing the tendency of the droplets to collide with and thus stick to the dryer walls.

The width of the distribution of droplet sizes can be expressed as the span of the distribution, S, which can be defined as:

$$S = \frac{D_{V90} - D_{V10}}{D_{V50}}$$

where
$D_{V90}$ = droplet diameter below which 90% (by volume) of the total number of droplets lie;
$D_{V10}$ = droplet diameter below which 10% (by volume) of the total number of droplets lie;
$D_{V50}$ = median droplet diameter (by volume).

The width of the droplet size distribution expressed as the span, S, in the present process is preferably from 0.5 to 1.2, and more preferably from 0.5 to 1.0 and especially preferably 0.6 to 1.0.

The span, S, is related to the particle size distribution of the dry particulate solid obtained from this process because the droplet size distribution and solid particle size distribution are of similar magnitudes. The solid particles are generally smaller than the droplets because shrinkage usually occurs as the liquid evaporates during the drying process. The span for the dry particulate solid is preferably from 0.5 to 1.5.

The feedstock to the atomiser may be any convenient solution, dispersion or combination of solution and dispersion of the solid in the liquid. The solution, dispersion or combination thereof preferably contains from 20 to 55%, and more preferably from 30 to 45%, by weight of the product to be dried. A solution or dispersion containing greater than 55% solids may be too viscous and difficult to pump through the atomiser. The viscosities of the feedstock suitable for pumping through the atomiser are in the range from 1 mPas (milliPascal-second) to 1 PaS (Pascal-second).

In addition to the liquid and the solid to be dried the feedstock may contain additives such as preservatives, diluents, surfactants, dispersants, formulating agents and wetting agents.

The liquid may be any suitable volatile liquid preferably one with a boiling point from 30° to 200° C., more preferably from 50° to 150° C. It is preferred that the liquid is water or an organic liquid, especially a non-flammable organic liquid.

If the feedstock is a dispersion or a combination of solution and dispersion the solids present are preferably ground or milled so that the particles thereof are 100 micrometers or less in size so that feed to the atomiser is not impaired and blockages are prevented.

The feedstock may be pre-heated to a suitable temperature. Pre-heating generally improves the solubility of the product in the liquid, reduces the viscosity of the feedstock, thus making it easier to pump the feedstock through the atomiser and reduces the heat input required in the spray dryer.

Suitable solids for the present process include dyes, pigments, detergents, surfactants, ceramics, polymers, plastics, resins, pesticides, fertilizers, pharmaceuticals, food products, inorganic chemicals and organic chemical intermediates.

A suitable atomiser is described in our co-pending application, GB 9017157.0, the contents of which are incorporated herein by reference and is further described below. This atomiser (hereinafter referred to as a spinning member) comprises an annular spinning member mounted for rotation on an axis concentric therewith, drive means for rotating the spinning member and material feed means having an exit in the spinning member, the spinning member having an interior surface which is relatively smooth over a region extending axially from an end of the spinning member from which material in liquid form is spun towards the exit of the material feed means, said end of the spinning member having a plurality of spinning points formed on the external periphery thereof and grooves which extend across said end from the interior surface to the external periphery thereof to direct material in liquid form to the spinning points.

In a preferred form, the spinning member is cup shaped and is mounted for rotation on the axis at its closed end. Alternatively, the spinning member may be in the form of an annular sleeve open at both ends and being mounted for rotation on the axis by means such as a spider or flange located generally centrally of the sleeve. In that instance, material can be spun from both ends of the sleeve, particularly when the product form is particles or powders.

In use, although various orientations of the spinning member can be envisaged, the preferred orientation is with the axis disposed substantially vertically and, when the spinning member is cup shaped and is used for atomising the feedstock to a spray dryer with the open end of the spinning member facing downwardly.

Preferably, the smooth region of the interior surface is substantially cylindrical. Alternatively, the smooth region of the interior surface may be divergent at least in part, e.g. immediately adjacent the exit of the material feed means, the surface diverging towards said end of the spinning member from which material is spun. When atomising a feedstock comprising dispersed particles, particularly where those particles are relatively dense such as inorganic particles for example zirconia, the presence of a divergent section of interior surface adjacent the exit of the material feed means prevents deposition by centrifugal action of the particles on the interior surface and thus prevents the premature segregation of liquids and solids which would otherwise interfere with the uniformity of flow through the spinning member. In some embodiments more than one divergent section may be provided. In other embodiments the interior of the spinning member immediately adjacent the exit of the material feed means may be formed to promote mixing, e.g. steps may be provided to impart radial shear forces to material moving along the interior surface of the spinning member in an axial direction towards the smooth region of the interior surface. The smooth region of the interior surface of the spinning member enables a substantially uniform film of material in liquid form to be established thereby contributing to the optimisation of the probability of obtaining a relatively uniform product form.

Preferably, the spinning points are defined by V-shaped formations coincident with the outer ends of the grooves. In one form of apparatus according to the invention, the grooves and their respective V-shaped formations are symmetrical, the planes of symmetry of the grooves either being coincident with diametral planes or with planes which intersect diametral planes at acute angles thereto and along lines parallel to the axis. In the latter instance, the angle is typically in the range 5° to 15°, and is usually of the order of 10°.

In another form of spinning member, the grooves and their respective V-shaped formations are asymmetrical, the base of each groove lying substantially in a diametral plane of the member or, alternatively, in a plane intersecting a diametral plane at an acute angle thereto and along a line parallel to the axis. In the latter instance, the angle is typically in the range 5° to 15°, and is usually of the order of 10°. In this form of spinning member, the trailing face of each groove, relative to the direction of rotation of the member, either lies in the plane in which the base of the groove lies or, more preferably, lies in a plane which intersects the plane in which the base of the groove lies along the base of the groove and at an angle, in the direction of rotation of the spinning member, of up to say 30°, typically 10° or 15°. The leading face of the groove, relative to the direction of rotation of the spinning member is at an angle of between 20° and 60°, typically 30°.

Preferably, the spinning points are at a radius from the axis which is greater than the radius of the external surface of the spinning member immediately adjacent the spinning points. In a preferred arrangement, the external surface of the spinning member is smoothly flared out to meet the extremity of the spinning points. In that instance, the minimum included angle of the generally frusto-conical plane in which the flared region of the external surface lies is about 12° to 14° and is preferably of the order of 30°. It has been found that this type of construction tends to minimise creep of the material being spun over the edge of the member and axially along its external surface before it breaks away from the spinning member.

Preferably, said end of the spinning member from which material is spun is bevelled whereby said end diverges outwardly from the interior surface of the spinning member towards the external periphery of said end. Typically, the included angle of the generally frusto-conical surface bounding said end is in the range 60° to 120° and is preferably about 90°.

Optional guide members such as fins are provided at the interior surface of the spinning member at locations intercalated between the mouths of the grooves, the guide members being of such a length that, in use, the film of material in liquid form established in the smooth region of the interior surface of the spinning member is split or divided into separate flow streams by the guide members before it reaches the grooves. This arrangement minimises viscoelastic effects which may result in non-uniform flow of the material in liquid form in the grooves thereby contributing to the optimisation of the probability of obtaining a relatively uniform product form. The guide members may be formed integrally with the spinning member or, alternatively, they may be provided on an insert member which is located within the spinning member. In the latter instance, the guide members and the insert member are dimensioned such that the guide members are a close fit with the interior surface of the spinning member.

The guide members lie in diametral planes or, alternatively, when the grooves are asymmetrical, in planes including the trailing faces of the grooves.

A suitable spray dryer is provided with an annular spinning member in place of a conventional atomiser. The spinning member is mounted for rotation on an axis concentric therewith, drive means for rotating the spinning member and material feed means having an exit in the spinning member, the spinning member being cup-shaped and having an interior surface which is relatively smooth over a region extending from adjacent the exit of the material feed means towards an end of the spinning member from which material in liquid form is spun, said end of the spinning member having a plurality of spinning points formed on the external periphery thereof, the spinning points being at a radius from the axis which is greater than the radius of the external surface of the spinning member, and grooves which extend across said end from the interior surface to the external periphery thereof to direct material in liquid form to the spinning points.

In a preferred embodiment an annular spinning member is mounted for rotation on an axis concentric therewith, drive means for rotating the spinning member and material feed means having an exit in the spinning member, the spinning member being cup-shaped and having an interior surface which is relatively smooth over a region extending from adjacent the exit of the material feed means towards an end of the spinning member from which material in liquid form is spun, said end of the spinning member having a plurality of spinning points formed on the external periphery thereof, the spinning points being at a radius from the axis which is greater than the radius of the external surface of the member, grooves which extend across said end from the interior surface to the external periphery thereof to direct material in liquid form to the spinning points and guide members mounted on the interior surface of the spinning member at locations intercalated between the mouths of the grooves.

In another preferred embodiment an annular spinning member is mounted for rotation on an axis concentric therewith, drive means for rotating the spinning member and material feed means having an exit in the spinning member, the spinning member being cup-shaped and having an interior surface which is relatively smooth over a region extending from adjacent the exit of the material feed means towards an end of the spinning member from which material in liquid form is spun, said end of the spinning member having a plurality of spinning points formed on the external periphery thereof, the spinning points being at a radius from the axis which is greater than the radius of the external surface of the spinning member, grooves which extend across said end from the interior surface to the external periphery thereof to direct material in liquid form to the spinning points, the grooves being asymmetrical and having their trailing faces, relative to the direction of rotation of the spinning member, lying substantially in diametral planes or in planes intersecting diametral planes at acute angles thereto and along lines parallel to the axis, and guide members mounted on the interior surface of the spinning member at locations intercalated between the mouths of the grooves.

The drive means can be any suitable drive means capable of driving the spinning member at suitable rotational speeds typically at rotational speeds of between 1000 rpm and 6000 rpm. Typically, the drive means comprises an electric motor and associated control equipment.

The feed means may be a suitable feed supply tube which may incorporate distribution means forming or adjacent the exit thereof in the spinning member. When the spinning member is cup-shaped, it is preferred that the feed means enters the member from the closed end thereof. Typically, the feed means may be mounted concentrically with the axis and may also form a support for mounting the spinning member for rotation on the axis. Alternatively, the feed means may be mounted parallel to the axis.

The spinning member tends to function as a gas pump and, accordingly, it can cause considerable difficulties in controlling gas flows in the apparatus. Consequently, as a matter of practicality, it is preferred to minimise those problems by providing the spinning member with a complementary insert member which substantially fills the spinning member at least in the region thereof adjacent the spinning end of the spinning member and which preferably has a planar end lying substantially in the plane containing the spinning end of the spinning member. The annular gap between the spinning member and the insert is relatively small and, to avoid boundary layer pumping effects, is generally not more than about 5 mm.

The surfaces of such an insert member facing the exit of the feed means can be used to confine material fed into the spinning member in an axial sense and to define part of a distribution flow path from the exit to the interior surface of the spinning member.

When the solution is to be heated the apparatus includes heater means such as induction heating coils.

It will be appreciated that more than one spinning member may be utilised in a stacked or nested relationship.

Spinning member will now be described by way of illustration with reference to the accompanying drawings, in which.

In a preferred form (see FIGS. 1 and 2), the spinning member 18 comprises a cup-shaped member having a planar base 40 and a cylindrical wall 42 depending from the base 40.

Figure 1:
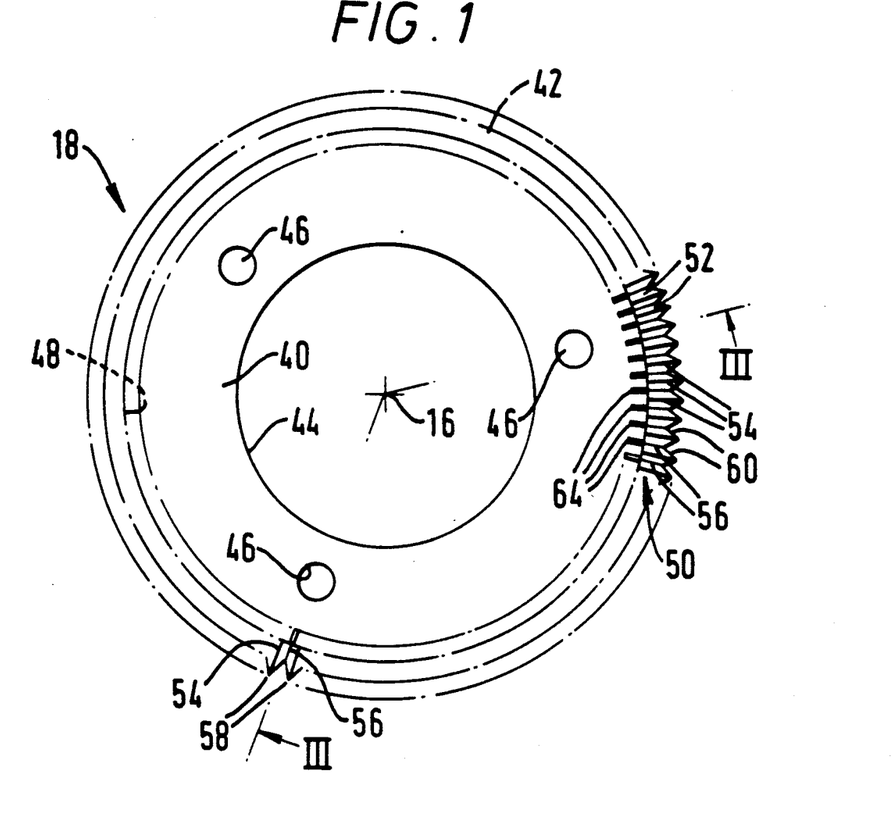
FIG. 1 is a bottom elevation of a spinning member showing for reasons of clarity only some of the spinning points and associated features.
Figure 2:
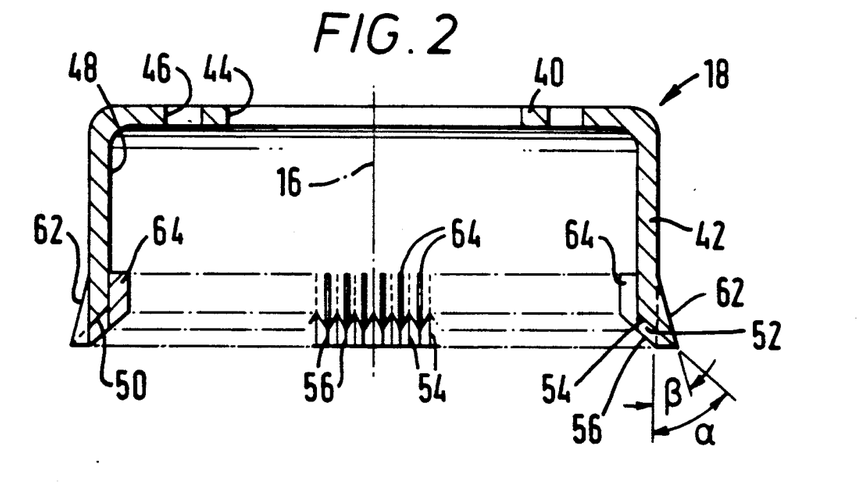
FIG. 2 is a section on line III—III in FIG. 1.

The base 40 of the spinning member 18 has a central aperture 44 through which a feed supply pipe extends and fixing apertures 46 by which the member 18 is mounted on the drive means for rotation on the axis 16.

The interior surface 48 of the wall 42 of the spinning member 18 is smooth over a region extending from the base 40 to the bottom edge 50 of the spinning member 18.

The edge 50 of the spinning member 18 is bevelled and the generally frusto-conical surface bounding the edge 50 has an included angle of 20 $\alpha$ (see FIG. 2) wherein $\alpha = 45°$. Grooves 52 extend across the edge 50 from the interior surface 48 of the spinning member 18 to the external periphery of the spinning member 18. The centre lines or bases 54 and the peaks 56 of the grooves 52 lie in diametral planes.

The grooves 52 terminate in spinning points 58 defined by V-shaped formations 60 on the external periphery of the spinning member 18. The formations 60 lie in a common plane parallel to the base 40 of the spinning member 18. The portions of the external surface of the spinning member 18 adjacent the formations 60 are flared smoothly outwardly toward the formations 60, the generally frusto-conical plane in which the flared region 62 lies has an included angle of $2\alpha$ (see FIG. 2) wherein $\beta = 15°$. Typically, a spinning member 18 of depth 70 mm and diameter 100 mm will have 120 or 180 spinning points.

Figure 4:
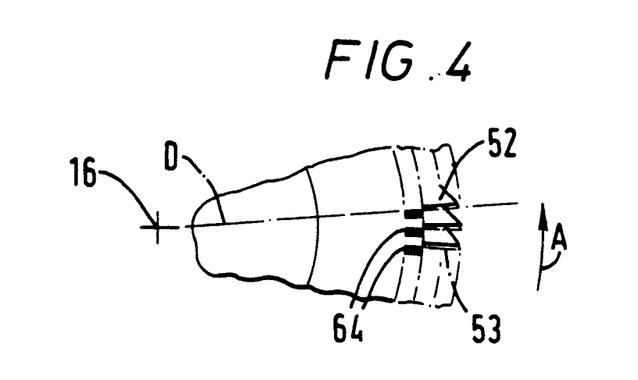
FIG. 4 is a view similar to FIG. 3 showing a modification of the second spinning member.

Guide fins 64, shown in FIGS. 1, 2 and 4 are optional and when present lie in diametral planes, are intercalated between the grooves 52 and are located on the lower region of the interior surface 48 of the spinning member 18.

In use the spinning member is spun at a desired rate and the feedstock is introduced into the spinning member 18 by an annular feed passage defined between the base 40 of the spinning member 18 and an adjacent surface of the insert member 36. The feedstock is forced to the periphery of base 40 by centrifugal force and down the interior surface 48 of the spinning member 18. The feedstock which may be a solution or dispersion is under the influence of centrifugal force and forms a substantially uniform film on the interior surface 48 of the spinning member 18. When the film of solution or dispersion reaches the fins 64, it is split into substantially equal streams which are then guided to the mouths of the grooves 52. The solution or dispersion then flows along the grooves 52 to the spinning points 58 from which it is discharged as discrete filaments. The filaments break up into discrete droplets and the liquid is removed by evaporation to give a particulate or powder product form.

Figure 3:
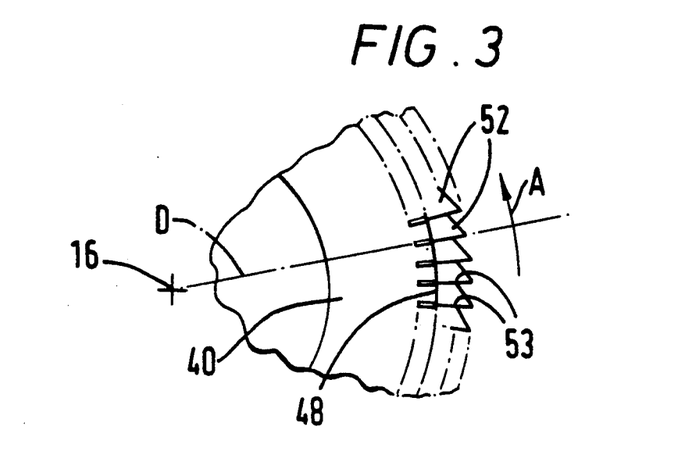
FIG. 3 is view similar to FIG. 1 but only of a segment of a second spinning member.

In another preferred form shown in FIG. 3, the grooves 52 are asymmetrical, the bases of the grooves 52 and the trailing faces 53, relative to bowl rotation (indicated by arrow "A"), of the grooves 52 lie in diametral planes "D". The leading faces of the grooves 52 are at an angle of 30° to the trailing faces 53. Because the trailing faces 53 of the grooves 52 lie in diametral planes "D", the solution or dispersion has a greater tendency to flow along the grooves 52 to the spinning points 58 rather than to flow over the peaks of the grooves to an adjacent groove.

In a modification shown in FIG. 4, the trailing faces 53 of the grooves 52 lie in planes which intersect the diametral planes "D" along the bases of the grooves 52. Those planes are at angles of 10°, in the direction of rotation of the arrow "A", to the planes "D"

A further modification is shown in FIG. 4. The fins 64 lie in the same planes as the trailing faces 53 of the grooves 52. The inclining of the fins 64 in that manner results in a smoother transfer of material from the surface 48 into the grooves 52.

Figure 5:
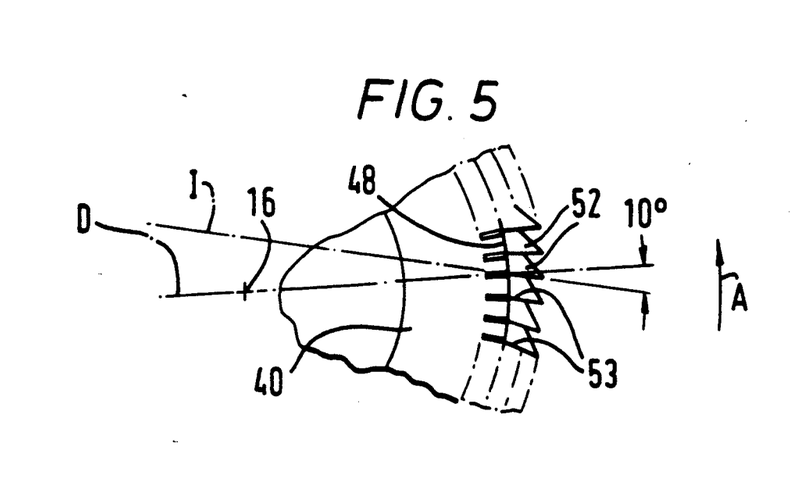
FIG. 5 is a view similar to FIG. 3 showing further modifications of the second spinning member.

In yet another preferred form shown in FIG. 5, the grooves 52 are the same as the grooves 52 shown in FIG. 3 except that trailing faces 53 of the grooves 52 lie in planes "I" which intersect diametral planes "D" at angles of 10° and along lines parallel to the axis 16. Owing to the circumferential component added to the radial component experienced by the filaments being discharged from the spinning points 58, the filaments exhibit greater stability and less tendency to shear away from the spinning points. Additionally, the filaments have a greater tendency to discharge from the actual points of the V-shaped formations 60 rather than from the trailing edge of the formations 60.

Figure 6:
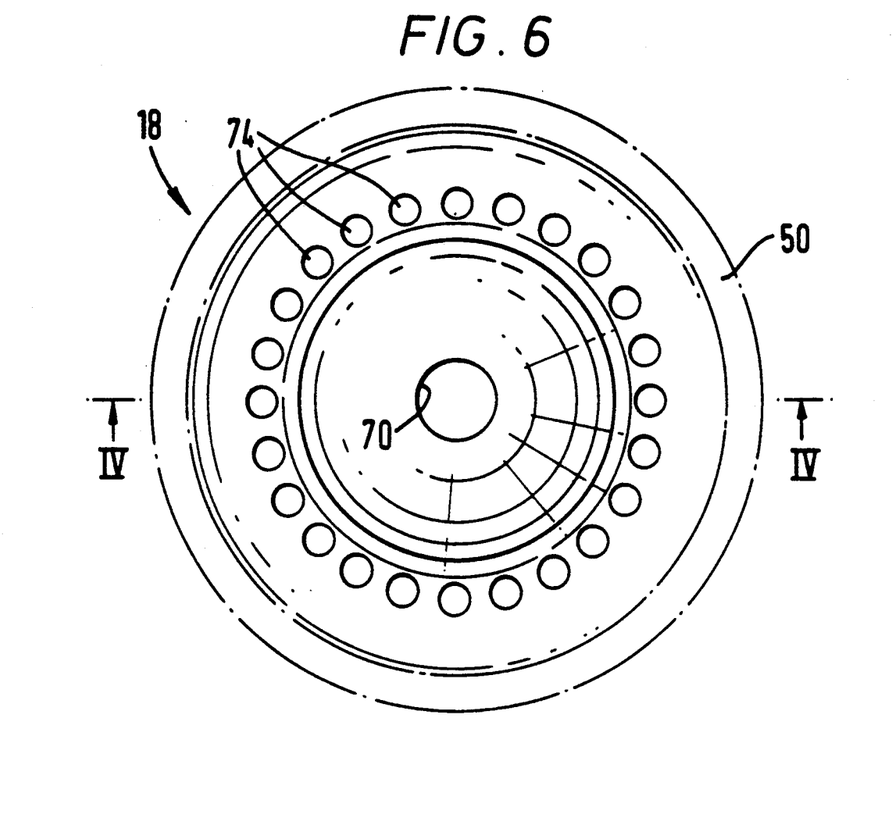
FIG. 6 is a bottom elevation of a spinning member omitting the spinning points and associated features.
Figure 7:
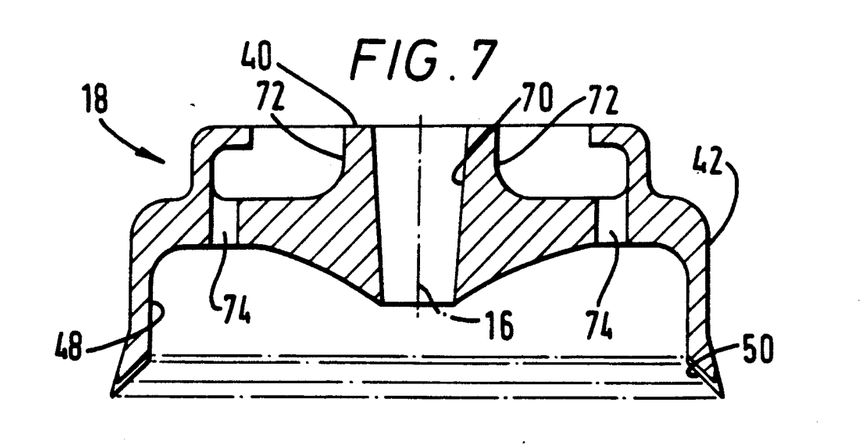
FIG. 7 is a section on line IV—IV of FIG. 6.

In yet a further preferred form shown in FIGS. 6 and 7 the spinning member 18 comprises a cup-shaped member having a planar base 40 and a cylindrical wall 42 depending from the base 40.

The base 40 of the spinning member 18 has a central aperture 70 by which the member 18 is mounted on the drive means for rotation on the axis 16 and has apertures 72 through which a feed supply pipe extends.

The interior surface 48 of the wall 42 of the spinning member 18 is smooth from the region extending from the base 40 to the bottom edge 50 of the spinning member 18. The bottom edge 50 of the spinning member 18 is bevelled and is of the same detailed design as the spinning member described above and as shown in FIGS. 1 and 2.

In use the spinning member shown in FIGS. 6 and 7 is rotated at a desired rate and the feedstock is introduced into the spinning member 18 via a feed supply pipe into apertures 72. The feedstock under the influence of a centrifugal force forms a substantially uniform film and passes via holes 74 over interior surface 48 to the bottom edge 50 of the spinning member 18. The feedstock film is split into substantially equal streams which are discharged as discrete filaments which break up into discrete droplets as described above. Liquid is removed by evaporation to give a particulate or powder product form as described above.

It will be appreciated that the various modifications shown in the drawings can be used in various combinations.

As will be appreciated, the spinning member 18 shown in the above figures are illustrative only and are not intended to be limitive.

The spinning member preferably has an outer diameter from 5 cm to 35cm and more preferably from 10 cm to 25 cm.

The number of spinning points present on the circumference of the spinning member is preferably from 300 to 750 and more preferably from 450 to 650 spinning points per metre.

Operating tip speed, T, of the centrifugal spinning apparatus may be expressed as follows:

$$T = R \times C$$

where R = revolutions per second C = circumference of spinning member (m) T = tip speed (ms$^{-1}$)

The operating tip speed is preferably from 8 to 100 and more preferably from 12 to 60 ms$^{-1}$.

Feed rate per unit circumference, F, to the spinning member may be expressed as follows:

$$F = \frac{V}{C}$$

where
F = feedrate per unit circumference (cm$^3$m$^{-1}$s$^{-1}$)
V = feed volume cm$^3$s$^{-1}$
C = circumference of spinning member (m)

Values of F are preferably from 5 to 150 and more preferably from 10 to 120 cm$^3$m$^{-1}$s$^{-1}$ The spinning member of the present invention preferably operates at rotational speeds from 1000 to 6000 rpm. For example a spinning member with an outer diameter of 25 cm would preferably be operated at from 1500 to 2500 rpm. These rotational speeds are less than the speeds for a conventional high speed atomiser.

The present invention provides a process for obtaining a dry particulate solid with a narrow particle size distribution which comprises feeding a solution or dispersion of the solid in a liquid through a spinning member, located within a spray dryer, which atomises the liquid into droplets with a narrow size distribution whereby the droplets may be converted into dry particles within the spray dryer.

It is preferred that the size distribution is such that the volume median diameter of the droplets is from 100 to 250 micrometers.

The invention is further illustrated by the following examples:

EXAMPLE 1

A spinning member as shown in FIGS. 6 and 7 with an outer diameter of 10.1 cm with 180 symmetrical teeth at its periphery, was rotated at a number of constant speeds by means of an electric motor in a rig provided with material feed means but no supply of drying air. A feedstock comprising a 38% solution of a surfactant (the sodium salt of a naphthalene sulphonic acid/formaldehyde condensate) with a Newtonian viscosity of 12 mPas was pumped to the spinning member at a number of feed rates. The drop size distributions of the resulting sprays were measured by a laser diffraction particle sizing instrument (Type 2600 LBD, manufactured by Malvern Instruments Ltd., UK) using model-independent software. The droplet spray was measured within 20 cm of the edge of the spinning member.

For comparative purposes, some measurements were also carried out using a conventional wheel atomiser of diameter 12 cm (Type SL24—120/F10) with 24 ports supplied by Niro Atomiser AS, Copenhagen. Table 1 shows data for the volume median diameter and the span of the droplet size distributions measured.

TABLE 1

| Feed Rate ($cm^3/min^{-1}$) | Rotation speed (rpm) | $D_{V50}$ (micrometres) | Span |
|---|---|---|---|
| For spinning member used in process of this invention: | | | |
| 205 | 3200 | 138 | 0.76 |
| | 3600 | 118 | 0.59 |
| | 4000 | 102 | 0.99 |
| 520 | 2800 | 200 | 0.81 |
| | 3200 | 160 | 0.94 |
| | 4000 | 121 | 1.06 |
| 833 | 3200 | 180 | 0.61 |
| For conventional Niro atomiser wheel: | | | |
| 205 | 3200 | 128 | 1.67 |
| | 4000 | 98 | 1.78 |

The span data show that the droplet size distribution from the spinning member used in the process of this invention is much narrower than from a conventional atomiser wheel at similar spin speeds.

EXAMPLE 2

The spinning member used in Example 1 was installed on the drive shaft of a Niro atomiser drive in a "Production Minor" spray dryer with a diameter of 120 cm manufactured by Niro Atomiser AS of Copenhagen. The dryer was heated with inlet air and with an inlet temperature of 245° C. The same feedstock as used in Example 1 was fed to the spinning member at a rate of 205 ml/minute.

The rotation speed of the spinning member was held at two constant rates (3200, 3600, 4000 rpm) to allow collection of dry product. The particle size distribution and spin speed data are summarised in Table 2. In addition packing derivatives of dried material were measured and these are included in Table 2.

Feedstock was also dried at the same feed rate using the conventional Niro wheel atomiser at the normal rotation speed of 16,500 rpm, as a control.

In all cases the size distribution of the dried product was measured using an Analysette 22 laser diffraction particle size analyser (manufactured by Fritsch, Germany) fitted with a dry particle feed system. The following table shows data for the volume median diameter, and the span of these distributions, and the proportion by weight of product measured as less than 30 micrometers in diameter.

TABLE 2

| Rotation speed (rpm) | $D_{V50}$ (micrometres) | Span | % W/W < 30 micrometres | Packing Density $g/cm^3$ |
|---|---|---|---|---|
| 3200 | 108 | 0.93 | 0.2 | — |
| 3600 | 105 | 1.28 | 0.2 | — |
| 4000 | 103 | 1.36 | 0.2 | 0.9 |
| Control 16500 | 63 | 1.72 | 7.7 | 0.77 |

The span data show that the size distribution of product is much narrower for the process of the present invention than for that from the conventional process.

Visually, the products from the process of the present invention were seen to have much better flow properties and contain virtually no dust, while the product from the conventional process was dusty. This is confirmed by the measured proportion by weight of particles less than 30 micrometers in diameter in Table 2.

The packing density of product from the process of the present invention is higher than that of the product from the conventional process. Higher packing density materials have advantages in that packing and shipping costs are reduced.

EXAMPLE 3

A feedstock comprising a dispersion of particles of a reactive dye (C.I. Reactive Blue 198) in a saturated solution of the dye in water, containing additionally a surfactant (sodium salt of a naphthalene sulphonic acid/formaldehyde condensate) and common salt, with a total solids content of 34% and a non-Newtonian viscosity ranging from 846 Pas at a shear rate of 0.002 sec$^{-1}$ to 1.16 Pas at a shear rate of 11.6 sec$^{-1}$ and 78 mPas at a shear rate of 291 sec$^{-1}$ was spray dried in the same dryer used for Example 2, at a feed rate of 245 ml/min. The feedstock was atomised using the spinning member described in Example 1.

The inlet temperature of the drying air was 290° C. The rotation speed of the spinning member was held constant at three different rates to allow collection of dry product and comparison of particle size distribution versus rotation speed.

In addition, the feedstock was atomised at the same feed rate and under the same conditions using the conventional Niro wheel atomiser at the normal, high rotation speed and also at two lower speeds, for comparison purposes.

Particle size distribution and spin speed data are summarised in Table 3. Packing densities of dried material were measured and these are included in Table 3.

TABLE 3

| Rotation speed (rpm) | $D_{V50}$ (micrometres) | Span | % W/W < 30 micrometres | Packing Density g/cm$^3$ |
|---|---|---|---|---|
| From spinning member of current invention | | | | |
| 6000 | 75.6 | 1.22 | 0.7 | 0.99 |
| 4500 | 78.2 | 1.10 | 1.4 | — |
| 3500 | 90.8 | 1.20 | 1.6 | 0.94 |
| From conventional Niro wheel | | | | |
| 14600 | 36.3 | 1.89 | 38 | 0.68 |
| 7000 | 41.9 | 1.70 | 28 | 0.83 |
| 6000 | 50.2 | 1.30 | 17 | — |

Microscopic examination of the dried particles showed that, unlike those from Example 2, a major proportion of them from both types of atomiser had fractured during drying. This explains the rather higher values for proportion by weight less than 30 micrometers, lower median size of particles and the higher value of the span produced by the spinning member of the present invention in this example compared with those in Example 2. Despite the fracturing, the proportion of material less than 30 micrometers is significantly lower for the product of the present process than for material produced using a conventional atomiser.

Thus the spans of the distributions of products from the spinning member of the current invention are substantially less than from the conventional wheel atomiser. The low value of the span of product collected from the Niro wheel atomiser at 6000 rpm is not believed to be representative of the product as a whole, since there was major deposition of products on the walls of the dryer at this speed, originating from the larger droplets as shown $D_{v50}$ values created by the atomiser. Experiments at lower rotation speeds were not carried out.

In addition, the proportion by weight of product less than 30 micrometers is consistently very much smaller from the spinning member of the current invention, and the products are visually much less dusty.

The particle density as shown in Table 3 of the reactive dye obtained from the spinning member of the present invention is higher than that obtained from the conventional Niro atomiser and that obtained from a pressure nozzle system. Higher particle density materials have advantages in that packaging costs and shipping costs are reduced.

EXAMPLE 4

A feedstock comprising a dispersion of particles of a black dye (mixture of C. I. Disperse Blue 291, C.I. Disperse Violet 93.1, C.I. Disperse Brown 19, C.I. Disperse Yellow 204) in a solution of a surfactant as above, with a total solids content of 39.2% and a non-Newtonian viscosity ranging from 877 mPas at a shear rate of 0.07 $sec^{-1}$ to $10^{-1}$ mPas at a shear rate of 1.2 $sec^{-1}$ and 11.3 mPas at a shear rate of 291 $sec^{-1}$ was spray dried in the same dryer used for Example 2, at a feed rate of 245 ml/min. The feedstock was atomised using the spinning member described in Example 1.

The inlet temperature of the drying air was 290° C. The rotation speed of the spinning member was held constant at three different rates to allow collection of dry product and comparison of particle size distribution versus rotation speed. Particle size distribution and rotation speed data are summarised in Table 4.

TABLE 4

| Rotation speed (rpm) | $D_{v50}$ (micrometres) | Span | % W/W <30 micrometres |
|---|---|---|---|
| 3580 | 103 | 0.94 | 0.4 |
| 4500 | 96 | 0.82 | 0.6 |
| 6170 | 91 | 0.91 | 0.7 |

The products were visually assessed as having a low dust content, consistent with the small proportion by weight of product less than 30 micrometers in diameter.

The dried disperse dye particles obtained from the process of the present invention dispersed more readily in aqueous media than the dried particles obtained from the same feedstock but using the conventional Niro atomiser.

We claim:

1. A process for obtaining a substantially dry solid in the form of particles with a narrow particle size distribution which comprises feeding a solution or a dispersion of the solid in a liquid medium through an atomizer, located in a spray dryer, the atomizer comprising an annular spinning member mounted for rotation of an axis concentric therewith, a drive means for rotating the spinning member and a solution or dispersion feed means having an exit in the spinning member, the spinning member having an interior surface which si relatively smooth over a region extending axially from an end of the spinning member from which the solution or dispersion is spun towards the exit of the solution to dispersion feed means, the end of the spinning member having a plurality of spinning points formed on the external periphery thereof and grooves which extend across the end from the interior surface to the external periphery to direct the solution or dispersion to the spinning points where droplets with a narrow size distribution and a volume median diameter from 100 to 250 micrometers are formed and pass into the spray dryer wherein the droplets are converted into the substantially dry solid.

2. A process according to claim 1 wherein the solution or dispersion of the solid in a liquid medium comprises from 20 to 55% by weight of the solid.

3. A process according to claim 1 wherein the solution or dispersion of the solid in a liquid medium comprises from 30 to 45% by weight of the solid.

4. A process according to claim 1 wherein the solution or dispersion further comprises one or more additives selected from the group consisting of preservatives, diluents, surfactants, dispersants, formulating agents and wetting agents.

5. A process according to claim 1 wherein the solution or dispersion has a viscosity of from 1 mPas to 1 Pas.

6. A process according to claim 1 wherein the solution or dispersion is pre-heated.

7. A process according to claim 1 wherein the solution or dispersion comprises a solid selected from the group consisting of dyes, pigments, detergents, surfactants, ceramics, polymers, plastics, resins, pesticides, fertilizers, pharmaceuticals, food products, inorganic chemicals and organic chemical intermediates.

8. A process according to claim 2 wherein the solid in the solution or dispersion has a particle size not exceeding 100 micrometers.

9. A process according to claim 1 wherein the liquid medium has a boiling point from 30° to 200 C.

10. A process according to claim 1 wherein the liquid medium comprises water or an organic liquid.

11. A process according to claim 1 wherein the size distribution of droplets has a span of from 0.5 to 1.2.

12. A process according to claim 1 wherein the size distribution of the particles of the substantially dry solid has a span of from 0.5 to 1.5.

13. A process according to claim 1 wherein the annular spinning member has from 300 to 750 spinning points per metre of its external periphery.

14. A process according to claim 13 wherein the spinning member is rotated at a tip speed of from 8 to 100 ms$^{-1}$.

15. A substantially dry solid in the form of particles produced by the process according to any one of claims 1-14.

* * * * *